3,549,621
12-SUBSTITUTED-6H-DIBENZ[b,f][1,4] OXAZOCIN-11(12H) ONES

Harry Louis Yale, 4 New York Ave., New Brunswick, N.J. 08901, and Ervin Richard Spitzmiller, 6 Seymore Ave., Rte. 37, Highland Park, N.J. 08904
No Drawing. Filed Apr. 29, 1968, Ser. No. 725,174
Int. Cl. C07d 87/54
U.S. Cl. 260—239.3                                   9 Claims

ABSTRACT OF THE DISCLOSURE

This invention relates to 12-substituted-6H-dibenz-[b,f][1,4]oxazocin-11(12H)ones and their salts, which may be used to relieve cardiac arrythmia and which may be produced by reaction of the anion of a ring substituted or unsubstituted 6H-dibenz[b,f][1,4]oxazocin-11(12H) one with an aminoalkyl halide, or alternatively, by reaction of the anion of a ring substituted or unsubstituted 6H-dibenz[b,f][1,4]oxazocin-11(12H)one first with a haloalkyl halide to give the intermediate haloalkyl derivative which is then treated with an amine to give the desired aminoalkyl compound.

SUMMARY OF THE INVENTION

This invention relates to 12-substituted-6H-dibenz[b,f][1,4]oxazocin-11(12H)ones which have the formula (I)
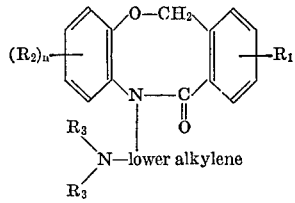

and to acid addition salts thereof.

The symbols in Formula I and in the succeeding discussion represent the substituents which follow: $R_1$ represents hydrogen or any of the four halogens of which chlorine, bromine and fluorine are preferred, in that order.

$R_2$ represents hydrogen, any of the four halogens, preferably chlorine or bromine, trihalomethyl groups such as trifluoromethyl, straight and branched chain lower alkoxy groups such as methoxy, ethoxy, propoxy, isopropoxy, butoxy and the like, trihalomethoxy, such as trifluoromethoxy, trihalomethylmercapto, such as trifluoromethylmercapto, and lower alkyl groups such as methyl, ethyl, propyl, isopropyl, butyl, isobutyl, t-butyl, amyl and the like, N,N-dialkylsulfamoyl groups such as N,N-dimethylsulfamoyl, lower alkanoyl groups such as acetyl, propionyl, and the like. The symbol $n$ represents 1, 2, 3 or 4.

The symbols $R_3$ may be the same or different representing hydrogen, lower alkyl or lower alkoxy groups such as those referred to above, or ω-hydroxy-lower alkyl groups such as hydroxymethyl, hydroxyethyl or the like. Illustrative of the group

are amino, dimethylamino, diethylamino, dipropylamino, methyl(ethyl)amino, di(β-hydroxyethyl)amino and the like.

The

group may also form a heterocyclic radical. The symbols $R_3$ may together represent the carbon (and hydrogen) and the oxygen, sulfur or nitrogen atoms which, with the nitrogen atom in the above group, form a 5-, 6- or 7-membered nitrogen heterocyclic containing not more than one hetero atom in addition to the nitrogen already shown in the group. These heterocyclic radicals may also bear one to three of the substituents represented by $R_2$ or one of the following: hydroxy lower alkyl such as hydroxymethyl, 2-hydroxyethyl or the like, hydroxy-lower alkoxy-lower alkyl such as 2-(2-hydroxyethoxy)ethyl or the like, alkanoyloxy-lower alkyl (up to about 14 carbons in the alkanoyl group) such as 2-heptanoyloxyethyl, carbo-lower alkoxy such as carbomethoxy, carboethoxy, carbopropoxy or the like, or 2-(alkanoyloxy-lower alkoxy)lower alkyl (with up to about 14 carbons in the alkanoyl group) such as 2-(decanoyloxyethoxy)ethyl or the like.

Illustrative of the heterocyclic radicals represented by

are the following: piperidyl; (lower alkyl)piperidyl [e.g., 2-, 3-, or 4-(lower alkyl)piperidyl or 4-(N-lower alkyl)-piperidyl]; di(lower alkyl)piperidyl [e.g., 2,4-, 2,5- or 3,5-di(lower alkyl)piperidyl or 2-, 3-, or 4-(N-lower alkyl)-2,3, or 4-(lower alkyl)piperidyl]; (lower alkoxy) piperidyl; [e.g., 2-methoxypiperidyl or 2-methoxypiperidyl]; hydroxypiperidyl; [e.g., 3-hydroxy- or 4-hydroxypiperidyl]; aminomethylpiperidyl [e.g., 4-aminomethylpiperidyl]; pyrrolidyl; (lower alkyl)pyrrolidyl, [e.g., 3-methylpyrrolidyl]; di(lower alkyl)pyrrolidyl [e.g., 3,4-dimethylpyrrolidyl]; (lower alkoxy)pyrrolidyl [e.g., 2-methoxypyrrolidyl]; morpholinyl; (lower alkyl)morpholinyl [e.g., 3-methylmorpholinyl]; di(lower alkyl) morpholinyl [e.g., 3,5-dimethylmorpholinyl]; (lower alkoxy)morpholinyl [e.g. 2-methoxymorpholinyl]; thiamorpholinyl; (lower alkyl)thiamorpholinyl [e.g., 3-methylthiamorpholinyl]; di(lower alkyl)thiamorpholinyl[e.g., 3,5 - dimethylthiamorpholinyl; (lower alkoxy)thiamorpholinyl [e.g., 3-methoxythiamorpholinyl]; piperazinyl; (lower alkyl)piperazinyl [e.g., $N^4$-methylpiperazinyl]; di(lower alkyl)piperazinyl [e.g., 2,5-dimethylpiperazinyl or 2,6-dimethylpiperazinyl]; (lower alkoxy)piperazinyl [e.g., 2 - methoxypiperazinyl]; (hydroxy - lower alkyl) piperazinyl [e.g., $N^4$-(2-hydroxyethyl)piperazinyl; (alkanoyloxy-lower alkyl)piperazinyl wherein the alkanoyloxy group has up to 14 carbons; [e.g., $N^4$-(2-heptanoyloxyethyl)piperazinyl or $N^4$ - (2 - dodecanoyloxyethyl)piperazinyl]; (hydroxy-lower alkoxy-lower alkyl)piperazinyl [e.g., $N^4$ - (2 - hydroxyethoxyethyl)piperazinyl]; and (carbo-lower alkoxy)piperazinyl, [e.g., $N^4$-(carbomethoxy-, carboethoxy-, or carbopropoxy)piperazinyl; or homopiperazinyl; or $N^4$ - (2 - hydroxyethyl)homopiperazinyl [e.g., $N^4$-(2-hydroxyethyl)-homopiperazinyl].

The particularly preferred compounds are those wherein $R_2$ is hydrogen, chlorine or trifluoromethyl, $R_1$ is hydrogen and $R_3$ is lower alkyl or $(R_3)_2N$ is $N^4$-(hydroxyethyl)piperazinyl or N-methylpiperazinyl.

The lower alkylene groups in Formula I are straight or branched chain aliphatic hydrocarbon groups such as methylene, ethylene, propylene, isopropylene, butylene, dimethylethylene and the like.

The compounds of Formula I form acid addition salts with various inorganic and organic acids. These salts frequently provide convenient means for separating the product from the reaction mixture in which it is produced or from the solvent in which it is extracted in view of their insolubility in various media. Thus the product may be precipitated in the form of an insoluble salt and converted, by conventional techniques, to the free base or to another salt if desired.

Illustrative salts include the hydrohalides, such as hydrochloride, hydrobromide and hydroiodide, especially the first two, other mineral acid salts such as phosphate, sulfate, nitrate, etc., organic acid salts such as oxalate, tartrate, malate, maleate, citrate, camphorsulfonate, methanesulfonate, benzenesulfonate, toluenesulfonate, salicylate, benzoate, ascorbate, mandelate, pamoate or the like.

The new compounds of Formula I and their physiologically acceptable acid addition salts are useful in the suppression of cardiac arrythmias in various animal species of which mice, rats and dogs are illustrative. An amount of either the free base or acid addition salt in the range of 5 to 100 mg./kg., preferably 45 to 65 mg./kg., incorporated in a conventional form for oral administration, such as tablet, capsule or elixir, or in a parenteral form for intramuscular administration may be used to relieve cardiac arrythmias. For example, in mice, a typical range is 45 to 50 mg./kg. orally.

Compounds of Formula I are prepared by reacting a compound of Formula II with an alkali or alkaline

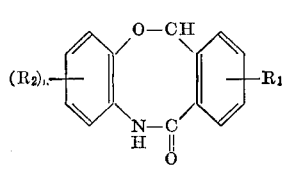

(II)

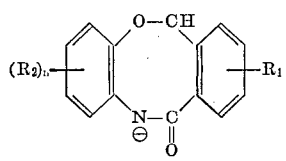

(III)

earth metal hydride, e.g., sodium hydride, lithium hydride or calcium hydride or an RM derivative, e.g., n-butyllithium, in an aprotic solvent, or a mixture of aprotic solvents, e.g., N,N-dimethylformamide or toluene, to form the anion (III), and reaction of the anion with an aminoalkyl halide, preferably the chloride or bromide. Alternatively, the anion (III) may be treated with a haloalkyl halide, e.g., ethylene chlorobromide or trimethylene chlorobromide to give the 12-haloalkylene derivative (IV) and the latter treated with ammonia or an amine to give compounds of the structure (I).

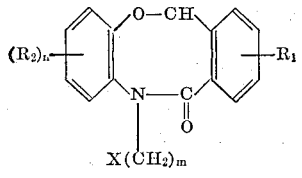

(IV)

X=Cl or Br
$m$=2, 3, 4

The starting materials of Formula II are produced as described in more detail in copending application Ser. No. 627,627, filed Apr. 3, 1967, by first reacting an unsubstituted or $R_2$-substituted o-halomethylbenzoic acid alkyl ester with an alkali metal salt of an unsubstituted or $R_1$-substituted o-nitrophenol in an organic solvent such as N,N-dimethylformamide. The resulting alkyl o-[o-nitrophenoxy]methylbenzoate is hydrolyzed to obtain the corresponding free benzoic acid. The nitro group of the latter is reduced to an amino group. This product is cyclized, for example, with N,N'-dicyclocarbodiimide in ethyl acetate, to obtain the starting material of Formula II.

The following examples are illustrative of the invention. Temperatures are on the centigrade scale.

EXAMPLE 1

6H-dibenz[b,f][1,4]oxazocin-11(12H)-one (a) To 103 g. of sodium o-nitrophenolate, 103 g. of sodium bromide, and 1100 ml. of N,N-dimethylformamide is added dropwise 186 g. of methyl 2-chloromethylbenzoate in 450 ml. of N,N-dimethylformamide, and the mixture heated about three hours at 85–90° to give about 147 g. of methyl o-[o-nitrophenoxy]methylbenzoate, M.P. about 109–111°.

(b) The product from (a), 144 g. suspended in 3600 ml. of 95% ethanol is stirred and refluxed for 10 minutes and then 31 g. of sodium hydroxide in 750 ml. of water is added as rapidly as possible. The refluxing is continued for an additional 10 minutes, the source of heat removed, and 92 ml. of concentrated hydrochloric acid in 750 ml. of water is added rapidly with vigorous stirring followed by 2100 ml. of water. The mixture is stirred, cooled, and the solid filtered to give about 126 g. of o-[o-nitrophenoxy] methylbenzoic acid, M.P. about 196–198°.

(c) The product from (b), 27 g., 200 ml. of 0.5 N sodium hydroxide and 2.0 g. Raney nickel catalyst are stirred for 10 minutes under nitrogen, and filtered. To the filtrate is added 10 g. of Raney nickel catalyst and the mixture hydrogenated at 50 p.s.i.g. for three hours to give about 22 g. of o-[o-aminophenoxy]methylbenzoic acid, M.P. about 178–179°.

(d) The product from (c), 8.0 g., in 750 ml. of anhydrous ethyl acetate is cooled to 18° and 7.2 g. of N,N'-dicyclohexylcarbodiimide in 50 ml. of anhydrous ethyl acetate is added, and the mixture stirred for 24 hours to give about 2.7 g. of 6H-dibenz[b,f][1,4]oxazocin-11 (12H)-one.

EXAMPLE 2

2-methyl-6H-dibenz[b,f][1,4]oxazocin-11(12H)-one

By substituting 117 g. of sodium o-nitro-p-cresolate for the sodium o-nitrophenolate in Example 1(a) and then proceeding through steps (b), (c), and (d), there is obtained 2-methyl-6H-dibenz[b,f][1,4]oxazocin-11(12H)-one.

EXAMPLE 3

2-methoxy-6H-dibenz[b,f][1,4]oxazocin-11(12H)-one

By substituting 133 g. of sodium o-nitro-p-methoxyphenolate for the sodium o-nitrophenolate in Example 1(a) and then proceeding through steps (b), (c), and (d), there is obtained 2-methoxy-6H-dibenz[b,f][1,4]oxazocin-11(12H)-one.

The o-nitro-p-methoxyphenol is prepared by the nitration of p-acetanisidine, separation of the o-nitro-p-acetanisidine, hydrolysis to o-nitro-p-anisidine, diazotization, and decomposition of the diazonium compound by water.

EXAMPLE 4

3-methyl-6H-dibenz[b,f][1,4]oxazocin-11(12H)-one

By substituting 117 g. of sodium o-nitro-m-cresol for the sodium o-nitriphenolate in Example 1(a) and then proceeding through steps (b), (c), and (d), there is obtained 3-methyl-6H-dibenz[b,f][1,4]oxazocin-11(12H)-one.

EXAMPLE 5

2-(trifluoromethyl)-6H-dibenz[b,f][1,4]oxazocin-11(12H)-one (a) By substituting 171 g. of sodium o-nitro-p-(trifluoromethyl)phenol for the sodium-o-nitrophenolate in Example 1(a) and then proceeding through steps (b), (c), and (d), there is obtained 2-(trifluoromethyl)-6H-dibenz[b,f][1,4]oxazocin-11(12H)-one.

(b) The o-nitro-p-(trifluoromethyl)phenol is prepared by the reaction of 3-nitro-4-chlorobenzotrifluoride with sodium methoxide to give 3-nitro-4-methoxybenzotrifluoride, followed by cleavage of the latter with pyridine hydrochloride.

EXAMPLE 6

2-(N,N-dimethylsulfamoyl)-6H-dibenz[b,f][1,4]-oxazocin-11(12H)-one

By substituting 196 g. of sodium N,N-dimethyl-4-hydroxy-3-nitrobenzenesulfonamide for the sodium o-nitrophenolate in Example 1(a) and then proceeding through steps (b), (c), and (d), there is obtained 2-(N,N-dimethylsulfamoyl) - 6H - dibenz[b,f][1,4]oxazocin-11-(12H)-one.

The 4-hydroxy-3-nitrobenzenesulfonamide is obtained by the nitration of p-hydroxybenzenesulfonic acid followed by conversion of the m-nitro-p-hydroxybenzenesulfonic acid to m-nitro-p-acetoxy-benzenesulfonic acid; the latter by treatment with thionyl chloride-N,N-dimethylformamide gives the sulfonyl chloride, and this, when treated with an excess of aqueous dimethylamine gives the desired dimethyl-4-hydroxy-3-nitrobenzenesulfonamide.

EXAMPLE 7

3-Methoxy-6H-dibenz[b,f][1,4]oxazocin-11(12H)-one

By substituting 133 g. of sodium 2-nitro-5-methoxyphenolate for the sodium o-nitrophenolate in Example 1(a) and then proceeding through steps (b), (c), and (d), there is obtained 3-methoxy-6H-dibenz[b,f][1,4]-oxazocin-11(12H)-one.

The 2-nitro-5-methoxyphenol is prepared by the nitration of m-chloroanisole, separation of m-chloro-p-nitroanisole, and then reaction as in Example 1(b).

EXAMPLE 8

2-Acetyl-6H-dibenz[b,f][1,4]oxazocin-11(12H)-one

By substituting 131 g. of sodium o-nitro-p-acetylphenolate for the sodium o-nitrophenolate in Example 1(a) and then proceeding through steps (b), (c), and (d), there is obtained 2-acetyl-6H-dibenz[b,f][1,4]oxazocin-11(12H)-one.

The o-nitro-p-acetylphenol is obtained by rearrangement of o-nitrophenyl acetate.

EXAMPLE 9

7-Chloro-6H-dibenz[b,f][1,4]oxazocin-11(12H)-one (a) By substituting 222 g. of methyl 3-chloro-2-chloromethylbenzoate for the methyl 2-chloromethylbenzoate in Example 1(a), there is obtained, following the procedure of the steps 1(b), (c), and (d), 7-chloro-6H-dibenz[b,f]-[1,4]oxazocin-11(12H)-one.

(b) The chlorination of o-xylene gives 3-chloro-o-xylene; dilute nitric acid oxidation of the 3-chloro derivative gives a mixture of products from which m-chloro-o-toluic acid is isolated by distillation; the latter, following conversion to the methyl ester and treatment with sulfuryl chloride, gives the required methyl 3-chloro-2-chloromethylbenzoate.

EXAMPLE 10

2-methyl-7-chloro-6H-dibenz[b,f][1,4]oxazocin-11(12H)-one (a) Employing 222 g. of methyl 3-chloro-2-chloromethylbenzoate, prepared as described in Example 1(b) and sodium-o-nitro-m-cresol and proceeding through steps 1 (a), (b), (c), and (d), there is obtained 2-methyl-7-chloro-6H-dibenz[b,f][1,4]oxazocin-11(12H)-one.

EXAMPLE 11

2-(trifluoromethylthio)-6H-dibenz[b,f][1,4]oxazocin-11(12H)-one

The chlorination of p-chloromethylthiobenzene gives p-chlorotrichloromethylthiobenzene; the latter treated with antimony penatfluoride - antimony trifluoride-hydrogen fluoride gives p-chlorotrifluoromethylthiobenzene; the latter is treated with nitric acid-sulfuric acid to give 3-nitro-4-chloro-(trifluoromethylthio)benzene. Substituting the latter in the procedure of Example 1(b) gives o-nitro-p-(trifluoromethylthio)phenol. Substituting the sodium salt of the last named compound for the sodium o-nitrophenolate in Example 1(a), and then proceeding as described in the rest of that Example, there is obtained 2-(trifluoromethylthio) - 6H - dibenz[b,f][1,4]oxazocin-11(12H)-one.

EXAMPLE 12

12-[2-(dimethylamino)ethyl]-6H-dibenz[b,f][1,4]-oxazocin-11(12H)-one

A solution of 4.9 g. of 6H-dibenz[b,f][1,4]-oxazocin-11(12H)-one in 30 ml. of dimethylformamide is added dropwise to a stirred suspension of 1.2 g. of 50% sodium hydride in oil dispersion at room temperature, in an atmosphere of nitrogen. During the addition the reaction temperature rises spontaneously to 35°. The resulting colorless solution is stirred at room temperature for 30 minutes, then warmed to 85°, cooled to 28°, and a solution of 4.5 g. of 2-dimethylaminoethylbromide in 30 ml. of toluene is added dropwise. After the addition the reaction mixture is stirred at room temperature for 1 hour, then at 85°, filtered and the filtrate concentrated to give 11 g. of a waxy residue. The residue is dissolved in 350 ml. of ether and the ether solution is extracted with a solution of 3 ml. of concentrated (37%) HCl in 25 ml. of water. The aqueous acidic solution is cooled, layered over with 300 ml. of ether and neutralized to a pH of 11 by the addition of solid potassium carbonate. The ethereal solution of the base is separated, dried over magnesium sulfate and the ether is removed leaving a solid residue of about 4.0 g. M.P. about 102–104°. It is recrystallized from 35 ml. of ligroin to give about 3.0 g. of product, M.P. 105–106°.

EXAMPLE 13

12-[3-(dimethylamino)propyl]-6H-dibenz[b,f][1,4]-oxazocin-11(12H)-one

To 5 g. of n-butyllithium in 50 ml. of dry hexane is added a ssupension of 11.3 g. of 6H-dibenz[b,f][1,4]oxazocin-11(12H)-one in 500 ml. of dry toluene, the whole is stirred for 1 hour at 70°, cooled to 30° and 10.0 g. of 3-dimethylaminopropyl bromide in 100 ml. of dry toluene is added dropwise. The mixture is then heated for 16 hours at 85–90° to give about 4.9 g. of product, M.P. 98–99° after recrystallization from hexane.

EXAMPLE 14

12-[2-(diethylamino)ethyl]-6H-dibenz[b,f][1,4] oxazocin-11(12H)-one

Employing the procedure of Example 12 but substituting 2-diethylaminoethyl chloride for the 2-dimethylaminoethyl bromide, there is obtained 12 - [2 - (diethylamino)ethyl] - 6H - dibenz[b,f][1,4]-oxazocin-11(12H)-one, M.P. 70–72°, after recrystallization from petroleum ether (B.P. 30–60°).

EXAMPLE 15

12-[2-(diethylamino)ethyl]-6H-dibenz[b,f][1,4] oxazocin-11(12H)-one maleate

A solution of 1.5 g. of maleic acid in 10 ml. of dry acetone is added to a solution of 4.2 g. of 12-[2-(diethylamino)ethyl] - 6H - dibenz[b,f][1,4]oxazocin - 11(12H)-one in 10 ml. of acetone. The maleic acid salt of 12-[2-(diethylamino)ethyl] - 6H - dibenz[b,f][1,4] - oxazocin-11(12H)-one crystallizes from the solution.

EXAMPLE 16

12-[3-dimethylamino)propyl]-6H-dibenz[b,f][1,4] oxazocin-11(12H)-one hydrochloride A solution of 4.0 g. of 12 - [3 - (dimethylamino)propyl] - 6H - dibenz[b,f][1,4]oxazocin - 11(12H) - one in 200 ml. of anhydrous ether is cooled in an ice-water bath and 5.0 ml. of 2.6 N ethereal hydrogen chloride is added, with stirring. The hydrochloride salt separates from solution.

EXAMPLE 17

12[3-(diethylamino)propyl]-6H-dibenzo[b,f][1,4]oxazocin-11(12H)-one

Employing the procedure of Example 12 but substituting 3-diethylaminopropyl chloride for the 2-dimethylaminoethyl bromide, there is obtained 12 - [3 - dimethylamino)propyl] - 6H - dibenz[b,f][1,4]oxazocin-11(12H)-one, M.P. 67–68° after recrystallization from pentane.

EXAMPLE 18

12[3-(bis-hydroxyethyl)amino]propyl-2,9-dibromo-6H-dibenz[b,f][1,4]oxazocin-11(12H)-one (a) Employing the procedure of Example 1(a) but substituting sodium p-bromo-o-nitrophenolate for the sodium o-nitrophenolate and methyl 5 - bromo - 2 - chloromethylbenzoate for the methyl 2-chloromethylbenzoate, there is obtained methyl o - [4 - bromo - 2 - nitrophenoxy] methyl-5-bromobenzoate.

(b) The bromination of methyl o-toluate gives methyl-5-bromotoluate; the latter with sulfuryl chloride in dry chloroform gives methyl 5-bromo-2-chloromethyl benzoate.

(c) When the product from (a) is carried successively through steps 1 (b), 1(c) and 1(d), there is obtained 2,9-dibromo-6H-dibenz[b,f][1,4]oxazocine-11(12H)-one.

(d) When the anion of the product from (c), obtained by substituting 8.5 g. of (c) for the 6H - dibenz[b,f][1,4]oxazocin-11(12H)-one in Example 12, is treated with 6.3 g. of trimethylene chlorobromide and the mixture is heated for one hour at 85°, there is obtained 12 - (3 - chloropropyl) - 2,9 - dibromo - 6H - dibenz[b,f][1,4]oxazocin-11(12H)-one.

(e) When the product from (d) in toluene and 4.2 g. of bis-(hydroxyethyl)amine are heated for 2 hours under reflux, there is recovered via acid extraction as in Example 12, the desired 12 - [3 - (bis - hydroxyethyl)amino] propyl - 2,9 - dibromo - 6H - dibenz[b,f][1,4]oxazocin-11(12H)-one.

EXAMPLE 19

2,9-difluoro-12-[2-(N'-homopiperazinyl)ethyl]-6H-dibenz[b,f][1,4]oxazocin-11(12H)-one Employing the procedure of Example 1(a) but substituting sodium p-fluoro-o-nitrophenolate for the sodium-o-nitrophenolate and methyl 2 - chloromethyl-5-fluorobenzoate for the methyl - 2 - chloromethylbenzoate there is obtained methyl - o - [4 - fluoro - 2 - nitrophenoxy]methyl-5-fluorobenzoate.

(b) Esterification of 5-nitro-o-toluic acid with methanol concentrated sulfuric acid gives methyl 5-nitro-o-toluate; the latter is reduced to the amine, the amine is diazotized, and the diazonium derivative converted to the fluoroborate, and the fluoroborate decomposed to give methyl - 5 - fluoro - o - toluate. The latter with sulfuryl chloride in dry chloroform gives methyl 2 - chloromethyl-5-fluorobenzoate.

(c) When the product from (a) is carried successively through steps 1(b), 1(c), and 1(d) there is obtained 2,9 - difluoro - 6H - dibenz[b,f][1,4]oxazocin - 11(12H)-one.

(d) When the anion of the product from (c) obtained by substituting 6.1 g. of (c) for the 6H - dibenz[b,f][1,4]oxazocin-11(12H)-one in Example 12 is treated with 6.3 g. of ethylene chlorobromide and the mixture is heated for one hour at 85° there is obtained 2,9-difluoro-12 - [2 - chloroethyl] - 6H - dibenz[b,f][1,4] - oxazocin-11(12H)-one.

(e) When the product from (d), 250 ml. of ethyl methyl ketone, 2.6 g. of sodium iodide, and 4.0 g. of homopiperazine are stirred and heated under reflux for 18 hours, and the crude product fractionally crystallized, there is obtained 2,9 - difluoro - 12 - [2 - ($N^1$ - homopiperazinylethyl) - 6H - dibenz[b,f][1,4]oxazocin - 11 (12H) - one as the more soluble component and bis-$N^1,N^4$ - 12 - [2,9 - difluoro - 6H - dibenz[b,f](1,4)oxazocin-11(12H)-one ethyl)homopiperazine.

EXAMPLE 20

2,3,4,5-tetrafluoro-6H-dibenz[b,f][1,4]oxazocin-11(12H)-one (a) Employing the procedure of Example 1(a) but employing sodium 2 - nitro - 3,4,5,6 - tetrafluorophenolate for the sodium o-nitrophenolate there is obtained methyl o-[3,4,5,6-tetrafluoro-2-nitrophenoxy]methylbenzoate.

(b) The nitro - 3,4,5,6 - tetrafluorophenol is obtained by reacting nitropentafluorobenzene with sodium methoxide, separating the desired 2 - nitro - 3,4,5,6 - tetrafluoroanisole from the isomeric 4 - nitro - 2,3,5,6 - tetrafluoroanisole, and cleaving the former with aluminum chloride to give 2 - nitro - 3,4,5,6 - tetrafluorophenol.

(c) When the product from (a) is carried successively through steps 1(b), 1(c), and 1(d), there is obtained 2,3,4,5 - tetrafluoro - 6H - dibenz[b,f][1,4]oxazocin-11(12H)one.

EXAMPLE 21

2-methyl-12-[5-(morpholinyl)pentyl)]-6H-dibenz[b,f][1,4]oxazocin-11(12H)-one (a) When the product from Example 2 is converted to the anion as in Example 12 but the 2-dimethylaminoethyl bromide is replaced by 5-(morpholinyl)pentyl bromide there is obtained the desired compound.

(b) By heating 122.5 g. of 5-chloropentanol and 174 g. of morpholine under reflux for five hours and working up the reaction mixture there is obtained 5-(morpholinyl) pentanol; treatment of the latter with 48% hydrobromic acid at 80° gives 5-(morpholinyl)pentyl bromide hydrobromide; the latter dissolved in water and the solution neutralized with potassium carbonate gives 5-(morpholinyl)-pentyl bromide as a pale yellow oil.

EXAMPLE 22

By employing the appropriately substituted 6H-dibenz[b,f][1,4]oxazocin - 11(12H) - one and the appropriate aminoalkyl halide, prepared as in Example 21 (b), the corresponding 12-substituted derivatives are obtained as indicated in the following table:

| Substituent in 6H-dibenz [b,f][1,4]oxazocin-11(12H)one | | | | |
|---|---|---|---|---|
| $R_2$ | $R_1$ | $n$ | Aminoalkyl halide | Substituent in 12-position |
| 2-CH$_3$O | H | 1 | CH$_3$—N(CH$_2$CH$_2$)$_2$N(CH$_2$)$_3$Cl | CH$_3$N(CH$_2$CH$_2$)$_2$N(CH$_2$)$_3$— |
| 3-CH$_3$ | H | 1 | CH$_2$(CH$_2$CH$_2$)$_2$N(CH$_2$)$_2$Cl | CH$_2$(CH$_2$CH$_2$)$_2$N(CH$_2$)$_2$— |

| Substituent in 6H-dibenz [b,f][1,4]oxazocin-11(12H)one | | | | Substituent in 12-position |
|---|---|---|---|---|
| R₂ | R₁ | n | Aminoalkyl halide | |
| 2-CF₃ | H | 1 | S(CH₂CH₂)₂N(CH₂)₂Br | S(CH₂CH₂)₂N(CH₂)₂— |
| 2-(CH₃)₂NSO₂ | H | 1 | (CH₂CH₂)₂N(CH₂)₃Cl | (CH₂CH₂)₂N(CH₂)₃— |
| 3-CH₃O | H | 1 | [3,4-dimethylpyrrolidinyl](CH₂)₃Cl | [3,4-dimethylpyrrolidinyl](CH₂)₃— |
| 2-CH₃CO | H | 1 | CH₃OC(O)—N(CH₂CH₂)₂N(CH₂)₃Cl | CH₃OC(O)—N(CH₂CH₂)₂N—(CH₂)₃— |
| 7-Cl | H | 1 | (CH₃O-CH-CH₂)(CH₂CH₂)N(CH₂)₂Cl | (CH₃OCH-CH₂)(CH₂CH₂)N(CH₂)₂ |
| 2-CH₃ | 7-Cl | 1 | (CH₃)₂N(CH₂)₄Cl | (CH₃)₂N(CH₂)₄— |
| 2-CF₃S | H | 1 | (CH₃)₂NCH₂CHCH₂Cl / CH₃ | (CH₃)₂NCH₂CHCH₂— / CH₃ |
| 2,3-(CH₃)₂ | H | 2 | (C₂H₅)₂NCH₂CHCl / CH₃ | (C₂H₅)₂NCH₂CH— / CH₃ |
| 1,2,3,4-F₄ | H | 4 | (CH₃)₂N(CH₂)₃Cl | (CH₃)₂N(CH₂)₃— |
| H | H | 1 | CH₃N(CH₂CH₂)₂N(CH₂)₃Cl | CH₃N(CH₂CH₂)₂N(CH₂)₃— |
| H | H | 1 | HOCH₂CH₂—N(CH₂CH₂)₂N(CH₂)₃Cl | HOCH₂CH₂—N(CH₂CH₂)₂N(CH₂)₃— |

EXAMPLE 23

12 - [3 - [N⁴-(2-hydroxyethyl)piperazinyl]propyl]-2-(trifluoromethyl)-6H-dibenz[b,f][1,4]oxazocine-11(12H)-one (a) When the anion of the product from Example 5 is reacted with trimethylene chlorobromide as in Example 18(d) there is obtained 12-(3-chloropropyl)-2-(trifluoromethyl)-6H-dibenz[b,f][1,4]-oxazocin-11(12H)-one.

(b) When the product from (a) 37.0 g., 500 ml. of ethyl methyl ketone, 13.0 g. of sodium iodide, and 26.0 g. of 2-piperazineethanol are stirred and refluxed for 18 hours, there is obtained as the major product 12-[3-(N⁴-(2 - hydroxyethyl(piperazinyl]propyl) - 2-(trifluoromethyl)-6H-dibenz[b,f][1,4]oxazocin-11(12H)-one.

EXAMPLE 24

12 - [3-[N⁴-(2-heptanoyloxyethyl)piperazinyl]propyl]-2-(trifluoromethyl)-6H-dibenz[b,f][1,4]oxazocine-11 (12H)-one When the product from Example 23 (b) and heptanoyl chloride are stirred and refluxed in dry chloroform, there is obtained the desired compound.

EXAMPLE 25

3-methoxypyrrolidinylethyl chloride

When 2-methoxysuccinic acid and acetic anhydride are refluxed for three hours and the mixture is concentrated to dryness there is obtained 2-methoxysuccinic anhydride. When the anhydride and 2-aminoethanol are heated in a sealed tube at 200°, there is obtained 2-(3-methoxysuccinimidyl)ethanol. The latter is hydrogenated at 200° and 2000 p.s.i. of hydrogen to give 3-methoxypyrrolidinylethanol. The ethanol derivative and thionyl chloride in dry chloroform give the desired 3-methoxypyrrolidinylethyl chloride.

EXAMPLE 26

12-[3-(methylamino)propyl]-2-(trifluoromethyl)-6H-dibenz[b,f][1,4]-oxazcin-11(12H)-one When the product from Example 24(a) and 4 N ethanolic methylamine are kept at room temperature for 72 hours in a sealed vessel and then heated for 3 hours at 50–60°, there is obtained the desired compound.

EXAMPLE 27

12-[3-(amino)propyl]-2-(trifluoromethyl)-6H-dibenz [b,f][1,4]-oxazocin-11(12H)-one When the product from Example 24(a) and potassium phthalimide are heated for 8 hours in N,N-dimethylformamide solution there is obtained the 12-[3-(phthalimido)propyl derivative. The latter, heated first with ethanolic hydrazine hydrate and then with ethanolic sodium hydroxide gives the desired compound.

EXAMPLE 28

2,3-dimethyl-6H-dibenz[b,f][1,4]oxazocin-11(12H)-one (a) Diazotization of 4,5 - dimethyl-2-nitroaniline followed by decomposition of the diazonium derivative in aqueous sulfuric acid gives 2-nitro-4,5-dimethylphenol.

(b) Employing sodium 2-nitro-4,5-dimethylphenolate in place of the sodium o-nitrophenate in Example 1(a) gives methyl o-(2-nitro-4,5-dimethylphenoxy)methyl benzoate.

(c) When the product from (b) is substituted for the corresponding product in Example 1(b) and the new product o-(2-nitro-4,5-dimethylphenoxy)methylbenzoic acid carried through procedure 1(d), there is obtained 2,3-dimethyl-6H-dibenz[b,f][1,4]-oxazocin-11(12H)-one.

EXAMPLE 29

12-[3-(4-hydroxypiperidyl)propyl]-2-(trifluoromethyl)-6H-dibenz-[b,f][1,4]oxazocin-11(12H)-one When the reaction of Example 24(b) is carried out with the exception that 20.2 g. of 4-hydroxypiperidine is substituted for the 2-piperazineethanol, there is obtained the desired compound.

EXAMPLE 30

12-[3-(4-aminomethylpiperidyl)propyl]-2-(trifluoromethyl)-6H-dibenz[b,f][1,4]oxazocin-11(12H)-one By substituting 22.8 g. of 4-aminomethylpiperidine for the 2-piperazineethanol in Example 24(b), there is obtained 12-[3-(4-aminomethylpiperidyl)propyl]-2-(trifluoromethyl)-6H-dibenz[b,f][1,4]oxazorin-11(12H)-one.

What is claimed is:

1. A compound of the formula

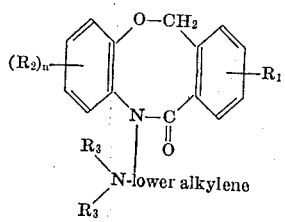

wherein $R_1$ is hydrogen or halogen, $R_2$ is hydrogen, halogen, trihalomethyl, lower alkoxy, trihalomethoxy, trihalomethylmercapto, lower alkyl, N,N-di-lower alkylsulfamoyl or lower alkanoyl, each $R_3$ is hydrogen, lower alkyl, lower alkoxy, hydroxy-lower alkyl, or the radical

is a nitrogen heterocyclic radical of the group consisting of piperidino, (lower alkyl)-piperidino, di(lower alkyl)-piperidino, (lower alkoxy)piperidino, hydroxypiperidino, aminomethylpiperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino, (lower alkoxy)piperazino, hydroxy(lower alkyl)piperazino, (lower alkoxy)piperazino, (hydroxy-lower alkyl)piperazino, alkanoyloxy(lower alkyl)piperazino wherein the alkanoyl group has up to 14 carbons, (hydroxy-lower alkoxy-lower alkyl)piperazino, (carbo-lower alkoxy)piperazino, homopiperazino or $N^4$-(2-hydroxy-lower alkyl)homopiperazino, $n$ is 1 to 4, and physiologically acceptable acid addition salts thereof.

2. A compound as in claim 1 wherein $R_1$ and $R_2$ each is hydrogen and each $R_3$ is lower alkyl.

3. A compound as in claim 1 wherein $R_1$ is hydrogen, $R_2$ is chlorine, each $R_3$ is lower alkyl and $n$ is 1.

4. A compound as in claim 1 wherein $R_1$ is hydrogen, $R_2$ is trifluoromethyl, each $R_3$ is lower alkyl and $n$ is 1.

5. A compound as in claim 2 wherein each lower alkyl group is methyl and the lower alkylene group has 2 carbons.

6. A compound as in claim 2 wherein each lower alkyl group is methyl and the lower alkylene group has 3 carbons.

7. A compound as in claim 1 wherein $R_1$ and $R_2$ each is hydrogen, $(R_3)_2N$ is hydroxyethylpiperazinyl and the lower alkylene group has 3 carbons.

8. A compound as in claim 1 wherein $R_1$ and $R_2$ each is hydrogen, $(R_3)_2N$ is methylpiperazinyl and the lower alkylene group has 3 carbons.

9. A compound as in claim 1 wherein $R_1$ is hydrogen, $R_2$ is trifluoromethyl, $(R_3)_2N$ is hydroxyethyl-piperazinyl, the lower alkylene group has 3 carbons and $n$ is 1.

References Cited

FOREIGN PATENTS 1,217,958  6/1966  Germany _____ 260—239.3TR1

OTHER REFERENCES

Burger: "Medicinal Chemistry," 2nd ed., pp. 72–81 (1960), (Interscience).

HENRY R. JILES, Primary Examiner

R. T. BOND, Assistant Examiner

U.S. Cl. X.R.

424—244, 246, 248, 250, 267, 274